March 23, 1937.  J. K. GILKERSON  2,074,691
GARDENING TOOL OR THE LIKE
Filed July 31, 1936  3 Sheets-Sheet 1

INVENTOR
John K. Gilkerson
BY
ATTORNEY

March 23, 1937. J. K. GILKERSON 2,074,691
GARDENING TOOL OR THE LIKE
Filed July 31, 1936 3 Sheets-Sheet 2
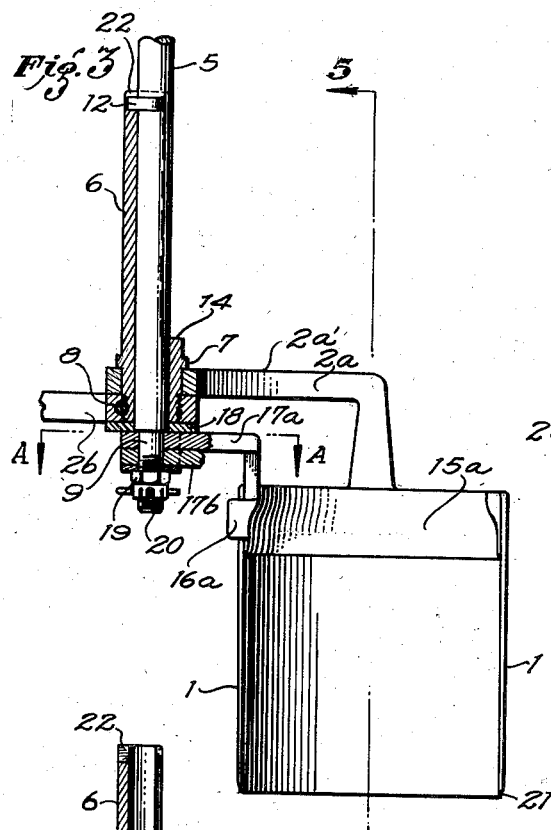
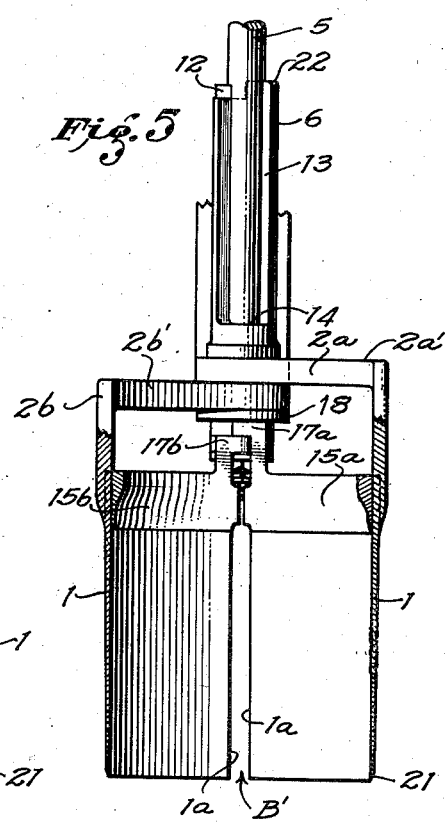
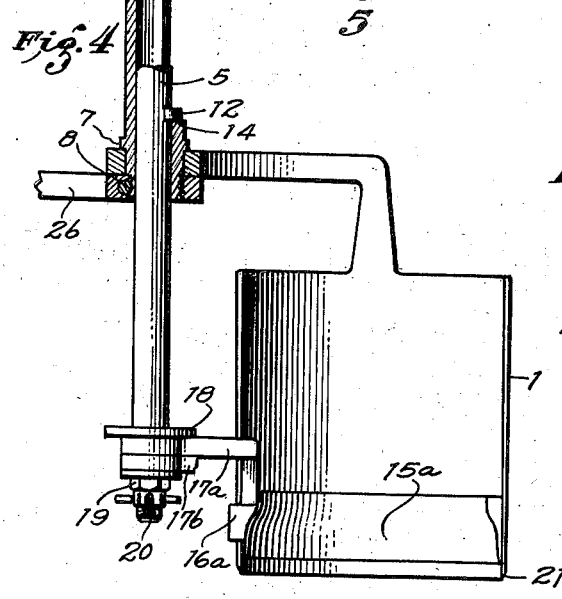
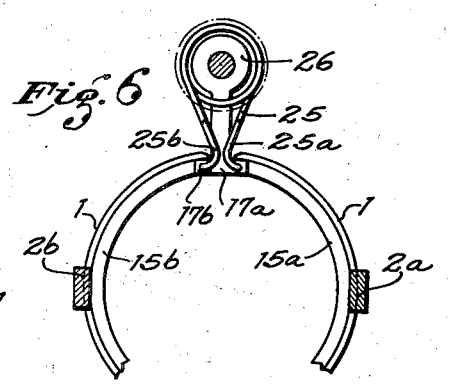
INVENTOR
John K. Gilkerson
BY
ATTORNEY March 23, 1937.  J. K. GILKERSON  2,074,691
GARDENING TOOL OR THE LIKE
Filed July 31, 1936  3 Sheets-Sheet 3
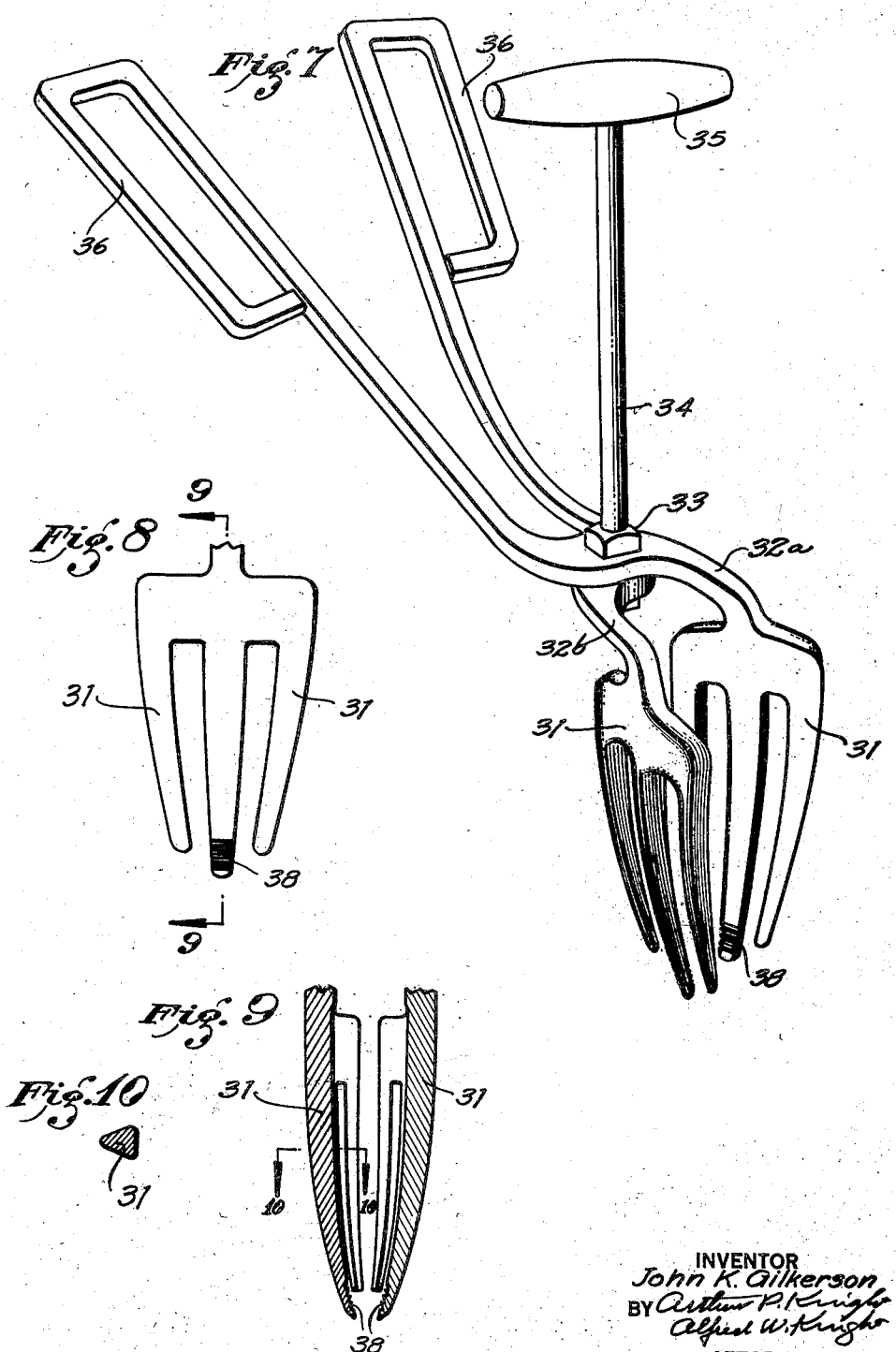
INVENTOR
John K. Gilkerson
BY
ATTORNEY Patented Mar. 23, 1937

2,074,691

UNITED STATES PATENT OFFICE 2,074,691

GARDENING TOOL OR THE LIKE

John K. Gilkerson, Glendale, Calif.

Application July 31, 1936, Serial No. 93,634

14 Claims. (Cl. 55—68)

This invention relates to gardening tools and pertains particularly to a tool which may be inserted into the ground for the purpose of lifting a portion of earth or a plant therefrom, and comparable gardening operations or the like.

A particular object of the invention is to provide a gardening tool which may be forced into the ground by a direct downward pressure to encompass a volume of soil or a plant and which may be pressed into tight engagement with the encompassed soil or plant to facilitate removal thereof by a direct upward movement of the device.

A further object of the invention is to provide a gardening tool of a tong-like construction provided with relatively movable portions adapted for manual engagement in an opening and closing movement of suitable blade members which are adapted for forcible insertion into a soil body, to cause an opening and closing movement of said blade members about an axis extending parallel to the direction of insertion of said blades in the soil.

A further object of the invention is to provide a tong-like gardening tool having cooperating blade members adapted to be forced into a body of soil or comparable material along a substantially vertical line, in which the above-mentioned forcible insertion of the blade members is obtained through the agency of an operating member which extends parallel and closely adjacent to the line of insertion of said blade members.

A further object of the invention is to provide a tong-like gardening tool having vertically extending separable blade members of arcuate shape and cooperating to define a substantially cylindrical space in one position of separation, and also provided with stripping means disposed interiorly of said blade members and adapted for vertical movement with respect thereto to facilitate the ejection of a body of soil which has been engaged by said blade members after the manner above described.

The device of the present invention may comprise, essentially, two vertically elongated blade members provided with operating handle means pivotally mounted with respect to one another and terminating in portions adapted for manual engagement, and an operating member extending vertically upwardly from said pivot. In its preferred embodiment such blade members are preferably substantially semi-cylindrical in shape and are arranged to define in one position of separation thereof, a vertically extending substantially cylindrical zone adapted to receive a body of soil or the like, together with stripping means disposed within this cylindrical zone closely adjacent the opposed inner faces of the blade members and relatively movable along said blade members lengthwise with respect to said zone.

Other objects and advantages of the invention will be brought out in the following specific description of certain embodiments thereof or will be apparent from such description. The accompanying drawings illustrate such embodiments of the invention and referring thereto:

Fig. 3 is a vertical section thereof, with the handle portion of the device broken away;

Fig. 4 is a view corresponding to Fig. 3, showing the stripping means in the lowermost operating position;

Fig. 5 is a sectional view of the device taken on line 5—5 in Fig. 3;

Fig. 6 is a sectional plan view of a modified form of the invention, taken on a plane corresponding to that indicated at A—A in Fig. 3;

Fig. 7 is a view corresponding to Fig. 1, showing a device provided with a modified form of blade members;

Fig. 8 is an inside face view of one of the blade members employed in this modification of the invention;

Fig. 9 is a sectional detail thereof taken on line 9—9 in Fig. 8; and

Fig. 10 is a sectional detail thereof taken on line 10—10 in Fig. 9.

Figures 1, 2:
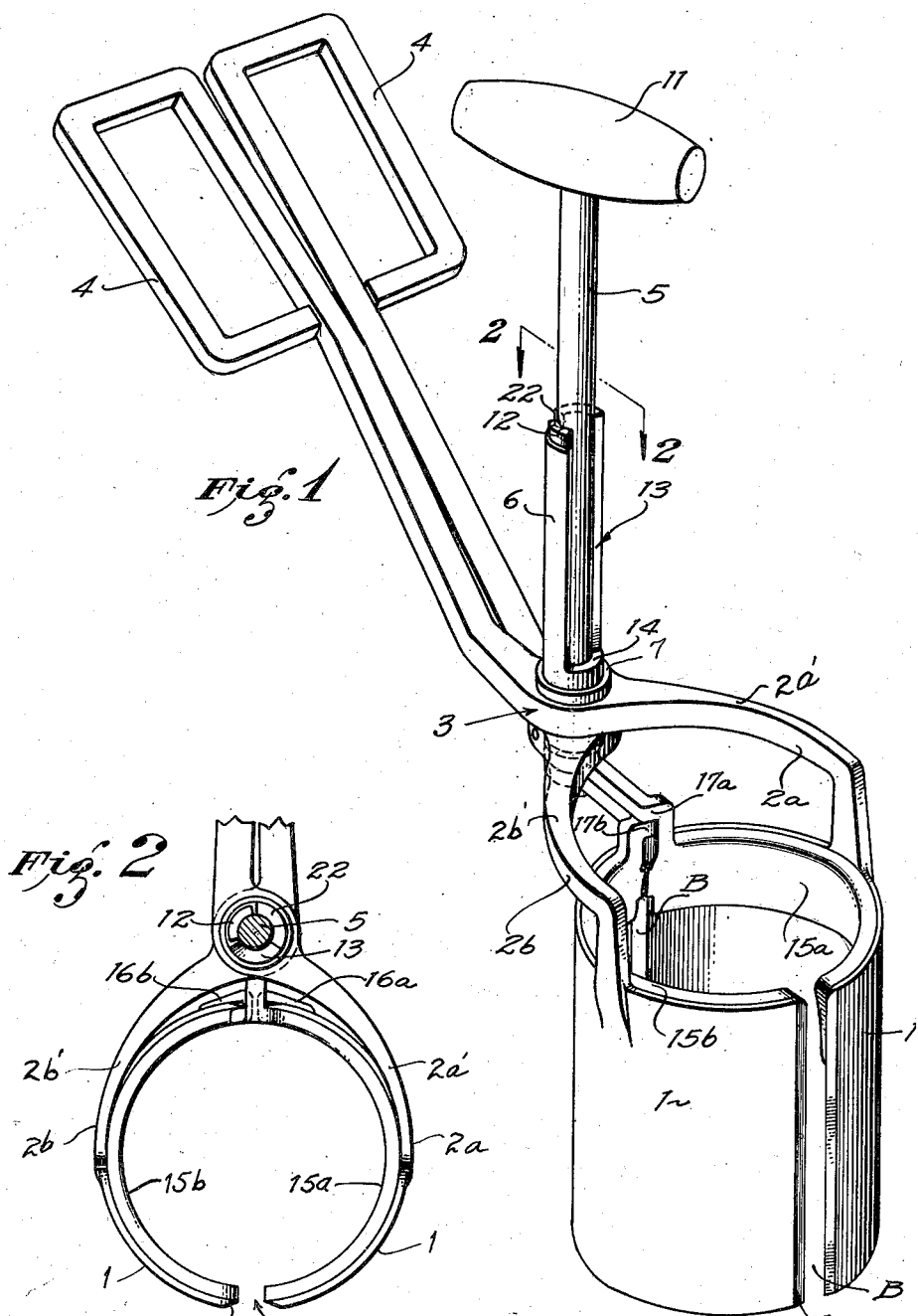
Fig. 1 is a perspective view of a preferred form of the present invention, showing the same in closed position.
Fig. 2 is a sectional partly broken away plan view thereof taken on line 2—2 in Fig. 1.

Referring to Figs. 1 to 5, the device of the present invention may comprise, in one embodiment, two substantially semi-cylindrical blade members 1 provided with supporting arms 2a and 2b pivotally intersecured as at 3 and extending rearwardly of the pivot at an upwardly inclined angle and terminating in handle members 4 which are adapted for manual engagement after the manner of a pair of tongs or shears as will be apparent to one skilled in the art. The blade members 1 are preferably of such shape as to define a space of substantially circular cross-section when the handle members 4 are brought to their limiting inward position, and the axis of pivotal movement of the blades is disposed parallel and closely adjacent to the approximate axis of the semi-cylindrical blades. The blades 1 are preferably not fully semi-cylindrical in shape, whereby the inner edges 1a are spaced apart at the forward and rearward sides of the device, as shown at B in Figs. 1 and 2 when the handle members 4 are in the aforesaid limiting inward position. The pivot 3 may be formed in any suitable manner, but preferably comprises a pin or shaft 5 rotatably disposed within a slotted sleeve 6 provided with a shoulder 7 adjacent its lower end, against which one of the arms, for example, 2a, may bear, said arm being freely rotatable on said sleeve, and the portion of said sleeve which is positioned downwardly from said one arm may be threaded to receive the other arm 2b, which may be secured in place in any suitable manner as through the agency of a pin or the like 8. The shaft 5 preferably extends downwardly past the arm 2b as at 9 after the manner shown in Figs. 3 and 5 in position to carry a stripping mechanism which is more fully described hereinafter. The upper end of the shaft 5 comprises an operating member and preferably carries a suitable handle member 11 which is employed to effect the forcible insertion of the blades 1 within a body of soil or the like, and a suitable lug or stop member 12 is provided on said shaft in position to engage the upper end of the sleeve 6. The sleeve 6 is provided with a slot 13 of sufficient width to receive the lug 12 and permit downward movement of the shaft 5 through said sleeve, said slot terminating in a suitable shoulder 14 to eliminate downward movement of said shaft.

The above-mentioned stripping means may comprise two stripping fingers 15a and 15b which fit closely against the inner faces of the blades 1 and are constrained to such position in a suitable manner, as by means of tabs or ears 16a and 16b as shown particularly in Figs. 2, 3, and 4.

As above pointed out, the blades 1 are so positioned that their inwardly directed edge portions 1a are spaced from one another as at B, and the ears 16a and 16b may extend through the rearward space indicated at B' in Fig. 5 and wrap outwardly about the outward surfaces of the blades 1. The fingers 15a and 15b are supported for movement with the blades 1 by mounting said fingers on the same pivotal axis as provided for said blades, as through the agency of support arms 17a and 17b which are rotatably disposed on the portion 9 of the shaft 5, a suitable washer or the like being provided between the upper arm of the support arm 17a and the lower surface of the arm 2b as at 18. The arms 2a, 2b, and 17a and 17b are maintained in their assembled relation through the agency of a suitable holding member such as a castellated nut 19 threadedly disposed on the projecting end portion 20 of said shaft 5, positioning said arms against the shoulder 7.

As an example of the use of the present invention, in the formation of an opening in a soil body into which a plant is to be inserted, the handle 11 of the operating member 5 may be grasped in the left hand and the handle members 4 grasped in the right hand, the operating member or shaft 5 being held in a substantially vertical position. The lower ends of the blades 1 are then placed over the spot at which the opening is to be made, and forced downwardly into the soil by direct downward pressure on the handle 11, assisted if necessary by a back and forth movement of the two handle members so as to cause a partial rotation of the blades 1 about the approximate axis thereof, and by application of further pressure on the substantially horizontal forwardly projecting portions of arms 2a and 2b directly above the aforesaid blades 1, as by pressing downward with the foot on said arm portions. As the blades are forced downwardly into the soil, the handle members 4 are preferably not brought closely into their limiting inward position, whereby the inner edges 1a of the blades 1 are disposed at a greater separation than is indicated at B, and the above-mentioned partial rotation of the blades will serve to cut downwardly into the soil in view of the fact that I preferably sharpen the lower ends of said blades as at 21. The edges 1a are preferably also sharpened as shown more particularly at 1a' in Figs. 1 and 2 to facilitate such rotational movement. During the downward movement of the device in the insertion of the blades within the soil, the lug 12 is preferably positioned in engagement with the upper end of the sleeve 6 whereby the stripping fingers 15a and 15b are disposed at the upper end of the blades 1, as shown particularly in Figs. 3 and 5. The location of the lug at a position removed from the slot 13 is facilitated by the provision of a stop member 22 formed as a prolongation of the sleeve 6 at one side of the slot 13, whereby the operating member 5 may be lifted to its uppermost position and given a slight rotation, preferably in a right-hand direction into engagement with said stop member 22 when the device is being placed in position for insertion in the soil. When the device is fully inserted into the soil to the desired depth, the handle members 4 may be brought toward the inward limiting position, causing an inward movement of the blades 1 toward one another into more firm engagement with the encompassed soil, after which the device may be lifted from the ground by a direct upward pull on the handle 11 of the operating member 5, carrying with it the soil which is encompassed by said blades. The removal of this body of soil may be facilitated by a repetition of the partial rotation of the device by the described forth and back movement of the handle members 4. After removal of the body of soil from the ground, the compression on the members 4 may be relaxed and the soil allowed to drop from the blades 1, but if the soil is somewhat damp or adhesive and fails to fall cleanly from said blades, the same may be ejected by rotating the shaft 5 into a position such that the lug 12 registers with the slot 13, after which the handle 11 is forced downwardly, carrying the arms 17a and 17b and forcing the fingers 15a and 15b downwardly along the inner surfaces of the blades 1 to some such position as shown in Fig. 4.

In place of or supplementary to the ears 16a and 16b I may provide spring means for effecting the desired engagement of the fingers 15a and 15b with the inner walls of the blades 1, and as shown in Fig. 6, such spring means may comprise a coil spring 25 whose two end portions 25a and 25b respectively engage the arms 17a and 17b to bias the same outwardly to force said fingers against said blades 1. The coil portion of the spring 25 may advantageously be disposed about the hub portions 26 of the support arms 17a and 17b, as will be apparent to one skilled in the art.

In Figs. 7 to 10, I have illustrated a further modification of the device in which tined blade members 31 are substituted for the blades 1 above, said blade members being carried by suitable supporting arms 32a and 32b pivotally mounted as at 33 on a suitable vertically extending operating member or shaft 34, terminating in a handle 35, said arms being extended rearwardly of the pivot 33 and inclined at an upward angle as shown particularly in Fig. 7, terminating in handle members 36. Fig. 7 illustrates the blade members 31 in a partly separated condition, while in connection with the first-described form of the invention, the blade members are extended substantially vertically and are brought into close proximity with each other only at their edge portions, the present described form of the device is preferably of such shape that the lower ends of the tines 31 are brought quite close together when the device is in closed position. Fig. 7 illustrates the device in a partly open position and Fig. 9 shows the close approach which is obtained between the tine points when the device is in closed position.

I have illustrated the blades 31 as comprising three tines, the center one of which extends downwardly to a level somewhat below the lower ends of the outside tines, and this center tine is preferably provided with a plurality of upwardly directed serrations 38. It will be apparent that any desired number of tines may be employed and that the serrations 38 may be provided on any or all of the several tines, as desired.

Each of the above described forms of the invention is characterized by the provision of a vertically extending operating member such as shown at 11 and 35, and a laterally extending pair of handle members such as shown at 4 and 36, which are brought upwardly to a level which approximates that of the first-mentioned handle member. This arrangement provides for facile use of the apparatus in gardening operations.

For example, the device is particularly useful for transplanting potted plants either to another pot or to the ground. As an illustration, a cylindrical portion of earth may be removed from the ground and a plant to be transplanted may be removed from a pot and held firmly by the device so that the soil surrounding the plant is not appreciably disturbed. The plant may then be lowered into the cylindrical opening in the earth, the device being removed from the earth by manipulating the handle members so as to bias the blade members outwardly and by pulling upwardly on the operating member. In some instances it may be necessary to operate the stripper blades in order to work the blade members loose from the earth.

In order to facilitate this stripping procedure I find it preferable to employ stripper blades which are substantially wedge-shaped in cross section, as shown in Figs. 1 to 6, so that the strippers will tend to cut the soil away from the blade members and force the soil downward in the same operation. This characteristic is of particular value when removing the device from a plant which has been transplanted, since the soil surrounding the plant may be held firmly in the hole by a downward pressure on the stripper blades while the blade members are worked upwardly and out of the hole by manipulating the handle members. It will be appreciated that strippers may be incorporated with the embodiment of my device which employs tines as blade members if such a modification is considered desirable.

Since the axis of movement of the blade members is relatively close to the inner edges thereof and since said axis is substantially parallel to the longitudinal axis of the blades, the movement of the blade members is substantially transverse to the axis thereof so that soil removed by the device will be held with approximately the same compression along the length of the blades and will be released in the same manner when the handle means are manipulated. This transverse movement of the blade members tends to improve the efficiency of the action of the stripper blades and provides further utility to the device since the blade members may be opened to pass around the trunk of a plant in position to be pressed into the soil around the roots without the necessity of passing over the branches and foliage. It should also be noted that roots may be readily cut loose from around plants that are to be transplanted by rotating the blade members as the device is inserted into the soil.

From the above it may be seen that plants may be transplanted with a minimum disturbance to the roots since they are held firmly during the transplanting operation. Furthermore, the portion of soil removed from the earth may be approximately the same size as the soil containing the plant so that the plant may be readily inserted in the hole.

A particular advantage of the device is the ease with which it may be inserted in the soil; this is due primarily to the relation of the axis of the operating member and the axis of the blade members, said axes being in such close relation that the downward pressure on the operating member is transmitted to the blade members with very little tendency for the blade members to rotate in a vertical plane, thus allowing the operator to apply a maximum of downward force to the vertically extending operating member with one hand while applying a minimum of restoring torque to the handle members with the other hand.

When using the device in hard soil it may be advantageous to supplement the action of the operator's hands. It is for this reason that I prefer to form the arms 2a and 2b with substantially flat or horizontal surfaces at portions thereof adjacent and above the blade members 1, as shown at 2a' and 2b' in Figs. 3 and 5, so that they may be engaged by the feet of the operator as above described.

The form of the device illustrated in Figs. 7 to 10 may be advantageously employed as a transplanter, a weed puller, a hole digger for planting purposes, and as a garden implement of other uses. The device is particularly advantageous in that it will not tend to jam or clog with sticks or stones as it is inserted in the earth due to the spacing of the tines, which are spaced a greater distance at the top than at the bottom thereof so that obstructions which tend to clog them will move upwardly and be released as the device is lowered into the earth. Since the blade members may be drawn closely together the device may be used to remove weeds which ordinarily cannot be removed by pulling. Such weeds as dandelions may be removed by forcing the device into the ground so that the blade members surround the roots thereof, forcing the blade members into close proximity around the roots preferably so that the serrations on the tines engage the roots, and removing the device and the weed from the ground. Due to the nature of the device the weed may be removed with a minimum disturbance to the surrounding earth.

I claim:

1. A gardening tool which comprises two cooperating blade members adapted for insertion into the ground along a substantially vertical line; support members secured to said blade members and extending laterally to one side thereof, said support members being pivotally intersecured and adapted for pivotal movement about an axis adjacent to and extending substantially parallel to said vertical line and said support members extending laterally beyond said point of pivotal attachment in an upwardly inclined direction and terminating in handle means adapted for manual engagement; and an operating member extending vertically upwardly from said point of pivotal attachment and terminating in a handle member adapted for manual engagement.

2. The device set forth in claim 1, and comprising in addition, stripper means disposed at the inner surface of each of said blade members and respectively constrained for movement therewith.

3. The invention set forth in claim 1, and comprising in addition, stripper means disposed at the inner surface of each of said blade members; means constraining each of said stripper means to move with the respective blade member upon movement of said support members about said pivot; means associated with said operating member and secured to said stripper means for effecting vertical movement thereof with respect to the length of said blade members.

4. The device set forth in claim 1, said pivotal attachment of said support members including a vertical extended sleeve member secured to one of said support members and freely rotatable within the other of said support members and provided with a vertical slot along one side thereof extending downwardly from the upper end of said sleeve toward said support members, said operating member being rotatably disposed within said sleeve member and including a lug member positioned for engagement with the upper end of said sleeve at a portion thereof removed from said slot, said lug member being of such proportions as to freely enter said slot upon rotation of said operating member to move said lug member into registration with said slot.

5. A gardening tool which comprises two cooperating blade members adapted for insertion into the ground along a substantially vertical line; arm members secured to said blade members and extending laterally and upwardly from one side thereof, said arm members being pivotally intersecured and terminating in handle members adapted for manual engagement; and an operating member extending upwardly from said point of pivotal attachment and terminating in a handle member adapted for manual engagement.

6. A device as set forth in claim 5, said operating member extending substantially along a line parallel to and adjacent said substantially vertical line.

7. A device as set forth in claim 5, said operating member being pivotally mounted with respect to each of said arm members.

8. A device as set forth in claim 5, and comprising in addition, stripper means disposed at the inner surface of each of said blade members; means constraining each of said stripper means to move with the respective blade member upon movement of said arm members about said pivot; means associated with said operating member and secured to said stripper means for effecting vertical movement thereof with respect to the length of said blade members.

9. A gardening tool which comprises two cooperating tined blade members adapted for insertion into the ground, arm members secured to said blade members and extending laterally to one side thereof, said arm members being pivotally intersecured and adapted for pivotal movement about an axis adjacent to and extending substantially parallel to the direction of insertion of said blade members and said arm members extending laterally beyond said point of pivotal attachment in an upwardly inclined direction and terminating in handle means adapted for manual engagement, and an operating member extending upwardly substantially along the line of pivotal attachment of said blade members and terminating in a handle member adapted for manual engagement.

10. A device as set forth in claim 9, and further comprising serrations on the lower portions of a centrally located tine.

11. A device as set forth in claim 9, said tines having greater separation at the upper portions of the blade members than at the lower portions thereof.

12. A gardening tool which comprises two cooperating blade members adapted for insertion into the ground, arm members secured to said blade members and extending laterally to one side thereof, said arm members being pivotally intersecured and extending laterally beyond the point of pivotal attachment, stripper means disposed at the inner surface of each of said blade members and respectively constrained for movement therewith, and means carried by the structure for moving said stripper means along said blade members.

13. A device as set forth in claim 12, and further comprising spring means biasing said stripper means outwardly into engagement with the inner surfaces of said blade members.

14. A device as set forth in claim 12, said stripper means comprising stripper blades having their upper portions projecting inwardly toward one another.

JOHN K. GILKERSON.